(12) United States Patent
Karadeniz et al.

(10) Patent No.: US 11,733,354 B2
(45) Date of Patent: Aug. 22, 2023

(54) LIDAR RING LENS RETURN FILTERING

(71) Applicant: Zoox, Inc., Foster City, CA (US)

(72) Inventors: Turhan Karadeniz, Oakland, CA (US); Subasingha Shaminda Subasingha, San Ramon, CA (US); Ravi Sankar Mahankali, Freemont, CA (US); Denis Nikitin, Campbell, CA (US)

(73) Assignee: Zoox, Inc., Foster City, CA (US)

( * ) Notice: Subject to any disclaimer, the term of this patent is extended or adjusted under 35 U.S.C. 154(b) by 327 days.

(21) Appl. No.: 17/181,960

(22) Filed: Feb. 22, 2021

(65) Prior Publication Data

US 2021/0199764 A1   Jul. 1, 2021

Related U.S. Application Data

(63) Continuation of application No. 15/986,676, filed on May 22, 2018, now Pat. No. 10,928,485.

(51) Int. Cl.
| | |
|---|---|
| *G01C 3/08* | (2006.01) |
| *G01S 7/48* | (2006.01) |
| *G01S 7/4865* | (2020.01) |
| *G01S 17/10* | (2020.01) |
| *G01S 17/931* | (2020.01) |
| *G01S 7/487* | (2006.01) |

(52) U.S. Cl.
CPC ......... *G01S 7/4808* (2013.01); *G01S 7/4865* (2013.01); *G01S 7/4876* (2013.01); *G01S 17/10* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 6,137,566 A | * | 10/2000 | Leonard | ............... G01S 7/4873 |
| | | | | 250/214 DC |
| 6,535,275 B2 | * | 3/2003 | McCaffrey | ............. G01S 17/14 |
| | | | | 356/5.08 |
| 7,969,558 B2 | | 6/2011 | Hall | |
| 8,675,181 B2 | | 3/2014 | Hall | |
| 8,767,190 B2 | | 7/2014 | Hall | |
| RE46,672 E | | 1/2018 | Hall | |

(Continued)

FOREIGN PATENT DOCUMENTS

WO   WO2017221909 A1 * 12/2017   ............. G01S 7/497

*Primary Examiner* — Mark Hellner
(74) *Attorney, Agent, or Firm* — Lee & Hayes, P.C.

(57) ABSTRACT

A LIDAR sensor assembly includes a laser light source to emit laser light, and a light sensor to produce a light signal in response to sensing reflections of the laser light emitted by the laser light source from a reference surface that is fixed in relation to the LIDAR sensor assembly. A controller of the LIDAR sensor assembly can process a plurality of samples of reflected light signals, process the samples to remove erroneous readings, and then provide accurate distance measurement. The system can use low-pass filters, or other components, to filter the plurality of samples to enable the "actual," or primary, reflected light signal (i.e., light signal reflected off of a surface in an environment external to the sensor assembly, as opposed to extraneous, internal reflections off of lenses or other components or noise) to be identified and an accurate time of flight to be calculated.

20 Claims, 9 Drawing Sheets

(56) References Cited

U.S. PATENT DOCUMENTS

| | | |
|---|---|---|
| 10,613,225 B2 | 4/2020 | Kubota et al. |
| 10,928,485 B1* | 2/2021 | Karadeniz ............. G01S 7/4813 |
| 2003/0035097 A1 | 2/2003 | Lai et al. |
| 2011/0013173 A1 | 1/2011 | Luo et al. |
| 2013/0038485 A1* | 2/2013 | Nakamura ............ G01S 7/4865 |
| | | 342/195 |
| 2020/0217957 A1 | 7/2020 | Masuda et al. |

* cited by examiner

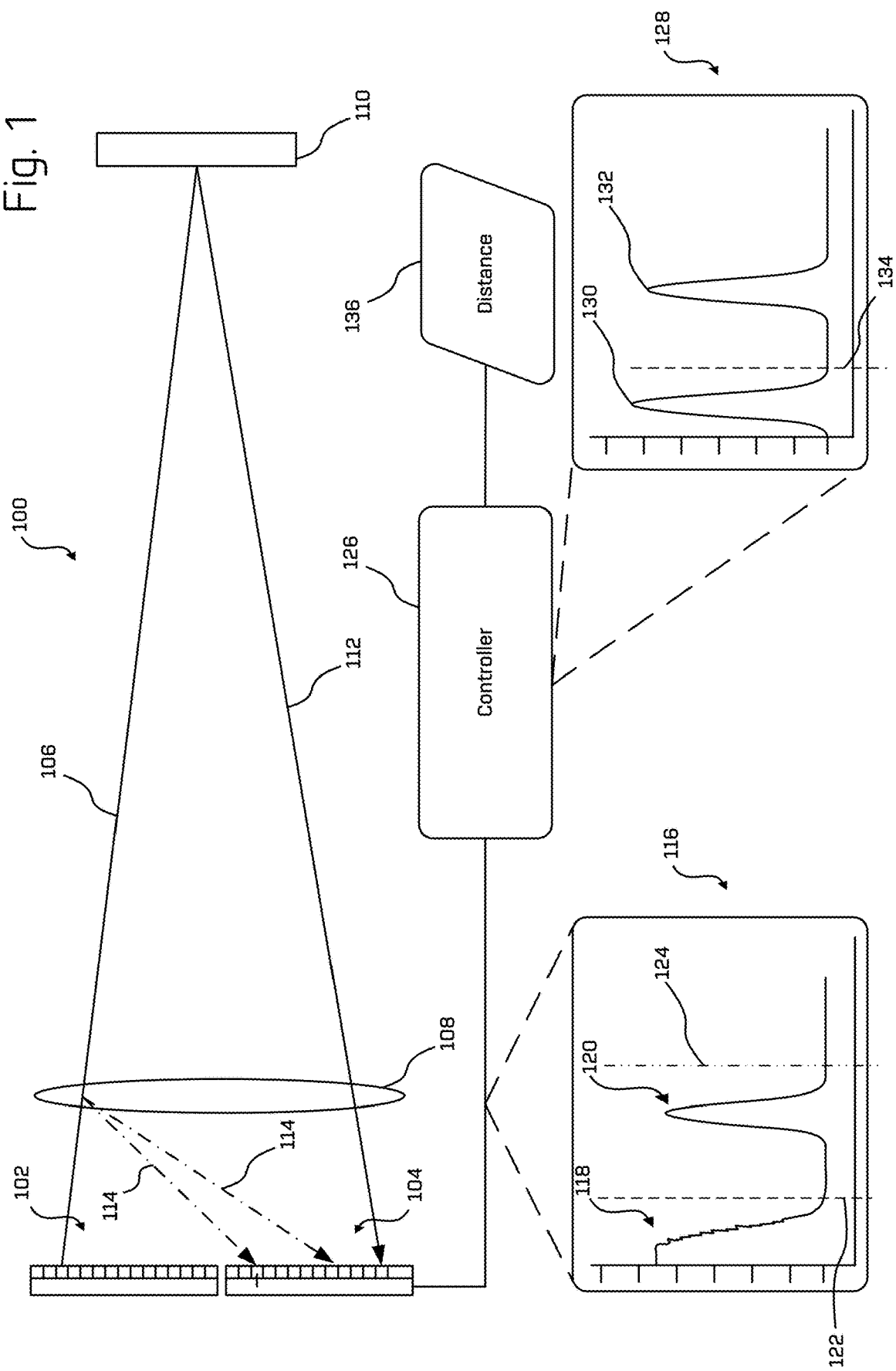

LIDAR RING LENS RETURN FILTERING

RELATED APPLICATION

This application is a continuation of and claims priority to U.S. patent application Ser. No. 15/986,676, filed on May 22, 2018, the disclosure of which is incorporated by reference herein.

BACKGROUND

The term "LIDAR" refers to a technique for measuring distances to visible surfaces by emitting light and measuring properties of the reflections of the light. A LIDAR system has a laser light source and a light sensor. The laser light source may comprise a laser that directs highly focused light toward a surface which then reflects the light back to the light sensor. The light sensor may comprise a photodetector such as a photomultiplier or avalanche photodiode (APD) that converts light intensity to a corresponding electrical signal. Optical components such as lenses may be used in the light transmission and reception paths to focus light, depending on the particular nature of the LIDAR system.

A LIDAR system has signal processing components that analyze reflected light signals to determine the distances to surfaces from which the emitted laser light has been reflected. The system may measure the "time of flight" of a light signal, for example, as it travels from the laser, to the surface, and back to the light sensor. A distance is then calculated based on the known speed of light. The accuracy of the distance measurement may be affected by reflections, interference, and other factors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a schematic depicting components associated with an example of a basic LIDAR sensor assembly, in accordance with some examples of the present disclosure.

DETAILED DESCRIPTION

Figure 2A:
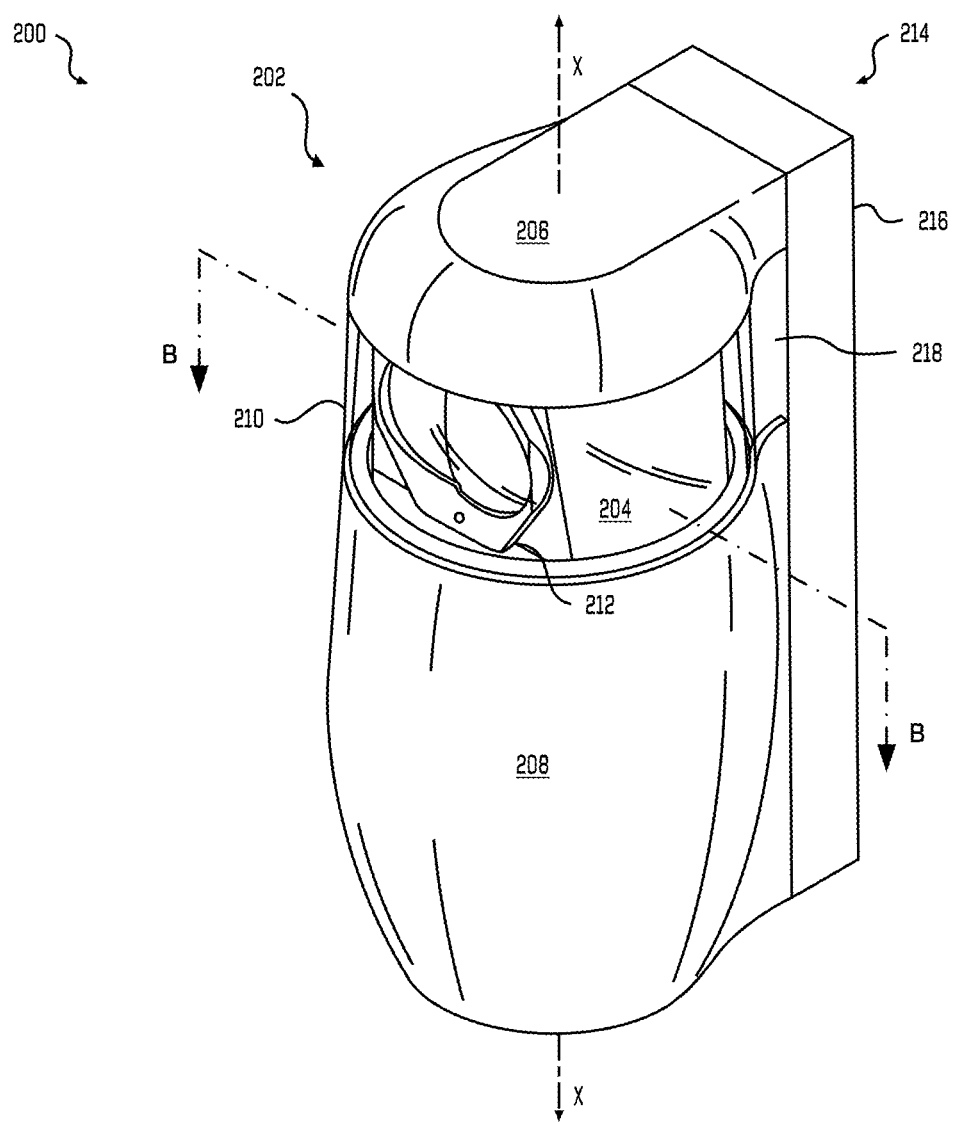
FIG. 2A is a perspective view of an example LIDAR sensor assembly showing the outer housing including a curved cover, in accordance with some examples of the present disclosure.

Typical LIDAR systems emit light (sometimes in the form of a laser light) and detect reflected light off of a surface in the environment that corresponds to the emitted light. The reflected light signals are then analyzed to determine the distances from the LIDAR system to surfaces from which the emitted laser light has been reflected. In some LIDAR systems, the system may determine, effectively, the "time of flight" (TOF) of a light signal, for example, as it travels from the laser, to the surface, and back to the light sensor. A distance can then be calculated based on the determined time of flight and the known speed of light. In other examples, an electronic component (e.g., a cross-correlator) can match, or correlate, the output signal with the return signal to enable the phase shift between the two curves to be determined. The TOF can then be calculated based on the phase shift As discussed below, a LIDAR sensor assembly can include various transparent covers or lenses. The covers may be transparent with little or no ability to focus, or otherwise modify, the laser light (apart from partially reflecting it) designed simply to seal the LIDAR sensor assembly. The lenses may be used to focus, and/or steer the light coming from, and returning to, the sensor, and/or to seal the sensor against environmental conditions. As used hereinafter, the terms lens and lenses are used to mean any material, through which the laser light must pass, regardless of whether the light is modified (e.g., focused or bent) in any way.

Under certain conditions, these lenses can create a strong reflected signal to the receiver of the LIDAR sensor assembly, which can affect distance measurement accuracy and the range of the LIDAR sensor assembly. For automatic gain control (AGC) LIDAR methods which attempt to determine an optimal power setting for each laser emission for a wide ranges of scenes and/or environments, it is impossible to determine a fixed range a priori with which to exclude reflected signals. A discussion of AGC is provided in U.S. patent application Ser. No. 15/487,170, entitled, "Laser Power Calibration and Correction", filed Apr. 13, 2017, which is incorporated by reference herein as if fully set forth below. In many cases, however, artificially truncating the response using a fixed time period or distance (discussed below) can limit the short-range capabilities of the LIDAR sensor assembly.

In addition, for particularly strong power settings, the light sensors of the LIDAR sensor assembly may become saturated for a period of time longer than the fixed cutoff, which can result in false positives. In other words, if the sensor system is still saturated at the cutoff time, then the first sample could be inaccurately determined to be a maximum, and thus, a reflection off of a surface. In this case, the LIDAR sensor assembly is merely measuring the "distance" to the cutoff time, which is clearly inaccurate. Trying to avoid strong reflected signals by simply reducing laser output, on the other hand, can limit the long-range capabilities of the LIDAR sensor assembly.

Other methods that account for and/or remove this reflected signal can also have negative effects on sensor performance. Instead of detecting a valid peak in the return (or, "Rx") signal, for example, one method is to simply employ a fixed distance trimming algorithm. In this scheme, any Rx signal received by the LIDAR sensor assembly within a predetermined amount of time—and thus, a predetermined distance from the sensor based on the fixed propagation speed of light—is simply ignored by the sensor logic. Unfortunately, due to the extremely high propagation speed of light, this reduces the effective minimum range of the sensor significantly. This may reduce the minimum range of the sensor to the point that it cannot be effectively used in some applications (e.g., vehicle navigation and automation). Further, as mentioned above, in those systems employing automatic gain control, this trimming may reduce an actual effective range of the LIDAR sensor assembly.

This application describes techniques for more accurately isolating any peaks cause by reflections of the transmitted (or, "Tx") signal by one or more lenses of the LIDAR system. The system can use improved algorithms to identify local minima in the Rx signal, rather than using fixed distance-based trimming. Thus, the system can transmit laser light, for example, identify, and remove local maxima and minima caused by reflections from the cover(s) or lens(es). The system can then identify an "actual" local minima between (1) the laser light reflected by the LIDAR sensor assembly's lens(es) and (2) laser light reflected by surface(s) in the environment. The system can then provide accurate distance measurements to the surface(s) based on the subsequent "actual" Rx signals attributable to laser light reflected by surface(s) in the environment. The system can also enable the use of higher Tx power which, in conjunction with automatic gain control (AGC), can be used to increase the range and/or resolution of the LIDAR sensor assemblies.

The system can use improved trimming algorithms to accurately detect local minima and maxima, thereby improving the accuracy of subsequent distance measurements. The system can be used for each output of the LIDAR sensor assembly to discard initial, erroneous samples and locate actual Rx signals from environmental surfaces. In the case of multi-channel LIDAR systems, these techniques can be performed for each emission of each channel (e.g., each laser light source and light sensor combination) of the LIDAR sensor assembly.

In some examples, a LIDAR sensor assembly suitable for the techniques described herein includes a rotatable assembly including one or more laser light sources, one or more light sensors, and associated circuitry mounted in a chassis that rotates about a vertical rotational axis to scan horizontally across a scene. During a rotation of the chassis, laser light is emitted in different horizontal directions. The horizontal angle of light emission varies with the rotation of the chassis. In other examples, LIDAR sensor assemblies according to this disclosure may be mounted in different orientations (e.g., may rotate about an axis other than a vertical axis such that the LIDAR sensor assembly scans in a path other than horizontal). Indeed, while the invention is described herein in the context of both fixed and rotating LIDAR sensors with various lenses and covers, the invention is nonetheless applicable to many LIDAR systems including non-rotating or fixed LIDAR sensor assemblies, solid state LIDAR sensor assemblies, MEMS based LIDAR sensor assemblies, etc., which have a lens, cover, or other element disposed in the transmit and receive path, regardless of the type of emission used (e.g., single pulses, pulse trains, continuous wave, frequency modulated continuous wave, flash, etc.).

The LIDAR sensor assembly may include a substantially transparent surface (e.g., a cover, lens, or "ring lens" surrounding the rotatable assembly). The substantially transparent surface may be coupled to a stationary portion of the LIDAR sensor assembly and may be fixed at a known distance from the axis of rotation of the rotatable assembly. In other examples, the lens may rotate with the LIDAR sensor assembly. As mentioned above, the substantially transparent surface may reflect a portion of the light emitted by the laser light source, which may affect the accuracy of the LIDAR sensor assembly.

To this end, a controller of the LIDAR sensor assembly can detect these initial reflections from the lens and other sources (e.g., interference, internal reflections, and/or noise), locate a local minimum subsequent to the detection of the initial reflection, and discard samples from a first sample to the local minimum to eliminate the initial reflection from TOF calculations. The controller can then detect a subsequent "actual" reflection from a surface to which the distance is to be calculated. In some examples, a low-pass filter can be used to eliminate any "false" local minima which may be associated with, for example, noise, interference, or other anomalies.

These and other aspects are described further below with reference to the accompanying drawings. The drawings are merely example implementations, and should not be construed to limit the scope of the claims. For example, while the drawings depict a rotating LIDAR sensor assembly including a specific number of channels, the techniques described herein are also applicable to LIDAR sensor assemblies using different numbers of channels, as well as other forms of LIDAR, as described above. Also, while in some examples the LIDAR sensor assembly is described as being mounted to a vehicle, in other examples LIDAR sensor assemblies according to this disclosure may be used in other scenarios, such as in a manufacturing line, in a security context, or the like.

As mentioned above, while discussed below in the context of both fixed and rotating LIDAR sensor assemblies, the disclosure is not so limited. The disclosure is also applicable to other types of LIDAR sensor assemblies such as, for example, solid-state LIDAR sensor assemblies, etc. Indeed, the disclosure is not limited to LIDAR sensor assemblies, but rather could be used with many sensors that use reflected waves as a means to measure distance (or perform other functions) in which sensor accuracy may be affected by unwanted reflected waves. Thus, the system could be used with RADAR, ultrasonic, infrared, and other sensors, for example, that use one or more covers or lenses or other devices that tend to reflect unwanted or erroneous reflections back to the light sensors of the system. The discussion below of LIDAR sensor assemblies is not intended to be limiting, therefore, but merely to simplify and clarify explanation.

Example LIDAR Sensor Assembly

A simplified LIDAR sensor assembly 100 suitable for use with the systems and methods disclosed herein is shown in FIG. 1. The LIDAR sensor assembly 100 can include a plurality of laser light sources 102 and a plurality of light sensors 104. The laser light sources 102 can produce laser light 106 (shown by solid lines), which may pass through one or more optical components 108 (e.g., lenses, covers, cases, etc.) on a path to a surface 110 to which the distance is being measured.

The optical component 108 can be one or more lenses, for example, configured to focus or steer the laser light 106 is some manner desirable to the functioning of the LIDAR sensor assembly 100 and focus primary reflection(s) 112 onto the plurality of light sensors 104. The optical component 108 can also simply be a cover or case provided to seal the enclosure, for example, or protect the laser light sources 102 and/or light sensors 104. Regardless of its function, if the optical component 108 is perfectly optically transparent, then the laser light 106 can travel undisturbed through the optical component 108, reflect off of the surface 110, and the primary reflection(s) 112 can return, back through the optical component 108, and to the light sensors 104 undisturbed. The distance to the surface 110 can then be calculated based on the TOF of the laser light 106 to and from the surface 110, using the fixed propagation speed of light.

In many cases, however, the optical component 108 may not be perfectly transparent. This may be due to flaws in the optical component 108 (e.g., an inclusion in the lens material), inherent reflectivity in the material of the optical component 108, a lack of anti-reflective coatings, etc. This lack of optical transparency can result in one or more internal reflections 114 (shown in the dot-dash line) of the laser light 106 off of the optical component 108 back to the light sensors 104 prior to the primary reflection(s) 112 returning from the surface 110.

The first graph 116 is an example of the raw data that may be returned by the light sensor 104 due to the primary reflection(s) 112 and internal reflection(s) 114. The primary reflection(s) 112 and internal reflection(s) 114, which return to the light sensors 104 at different times due to differences in TOF, can result in a first set 118 of one or more return signals caused by the internal reflections 114—the so-called "false" or undesirable reflections off of the optical component 108—followed by a second set 120 of one or more return signals caused by the primary reflection 112 of the laser light 106 off of the surface 110—the "actual" or desirable reflections for the distance calculation.

In many cases, the first set 118 can also result in more than one peak, or maximum, in the return signal caused by multiple internal reflections 114 at different angles (and thus, with different TOFs). Multiple maxima can make it difficult to determine where the first set 118 ends, at a local minimum 122, and the second set 120 begins. If the times associated with the first set 118 and the second set 120 are simply averaged, for example, this can result in a significantly shorter calculated distance than the actual distance to the surface 110. Similarly, arbitrarily choosing a cutoff 124 (shown by the dot-dot-dash line) that eliminates some initial time period in the beginning of the return signal can remove all return signals. At the least, this can result in a LIDAR sensor assembly 100 with a minimum measurement distance that is longer than it otherwise could be—i.e., the LIDAR sensor assembly 100 can only range surfaces outside the distance associated with the cutoff 124. In some cases, this could result in the LIDAR sensor assembly 100 failing to detect an object, which could result in a collision, or other mishap.

To this end, the LIDAR sensor assembly 100 can also include a controller 126 configured to process the return signal to both smooth the return signal, determine if there are internal reflections 114, and, if so, discard the first set 118 of reflections without affecting the accuracy of the second set 120 of reflections. This, in turn enables the LIDAR sensor assembly to accurately measure the distance to the surface 110. As discussed below in more detail, in some examples, the controller 126 can process the first set 118 and the second set 120 of return signals with one or more electronic components—e.g., an analog-to-digital converter (ADC), filter (e.g., a low-pass filter, a correlator, etc.) smooth the return signals, discretize the return signals into a plurality of samples, remove noise and interference, etc.

To this end, the second graph 128 is an example of the return signal from the first graph 116 after it has been processed by the controller 126. As shown, electronic processing has smoothed the first set 118 of return signals to remove the jagged raw data to produce a first local maximum 130 associated with the internal reflection(s) 114 and a second local maximum 132 associated with the primary reflection(s) 112.

As discussed below, this can enable the LIDAR sensor assembly 100 to more accurately identify a first local minimum 134, which, in turn, enables the LIDAR sensor assembly 100 to identify where the first set 118 of return signals ends. The LIDAR sensor assembly 100 can then discard all samples prior to the time associated with the first local minimum 134 because it is data associated with the internal reflections 114. The LIDAR sensor assembly 100 can then determine the time associated with the second local maximum 132 and output an accurate distance 136 to the surface 110 based on this time and the fixed propagation speed of light.

Figure 2B:
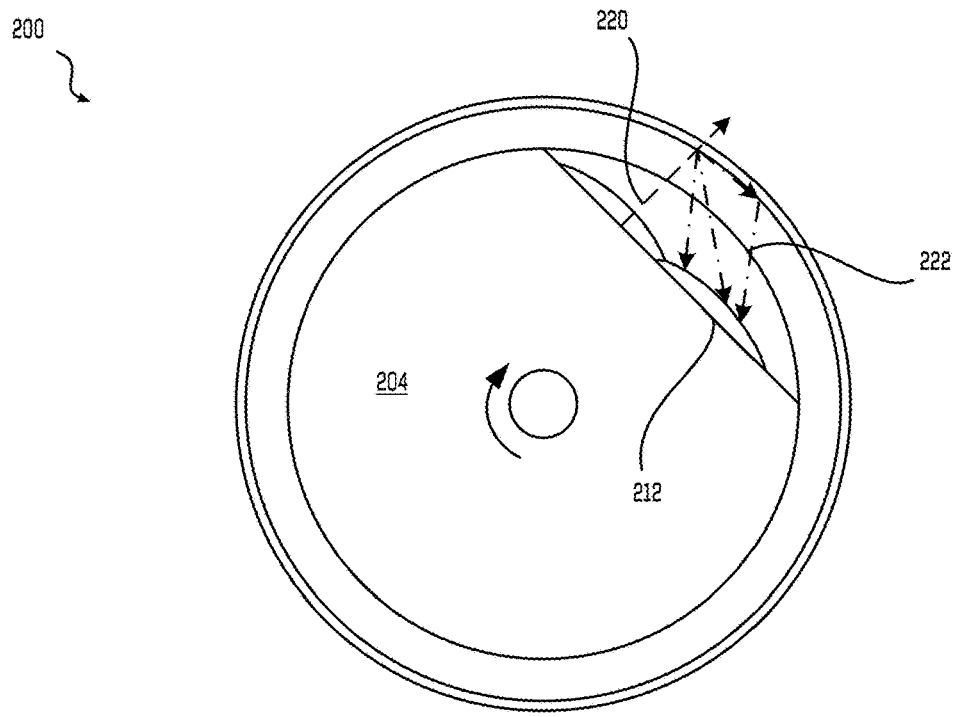
FIG. 2B is a simplified cross sectional view of the example LIDAR sensor assembly of FIG. 2A, taken along line BB of FIG. 2A, in accordance with some examples of the present disclosure.
Figure 2C:
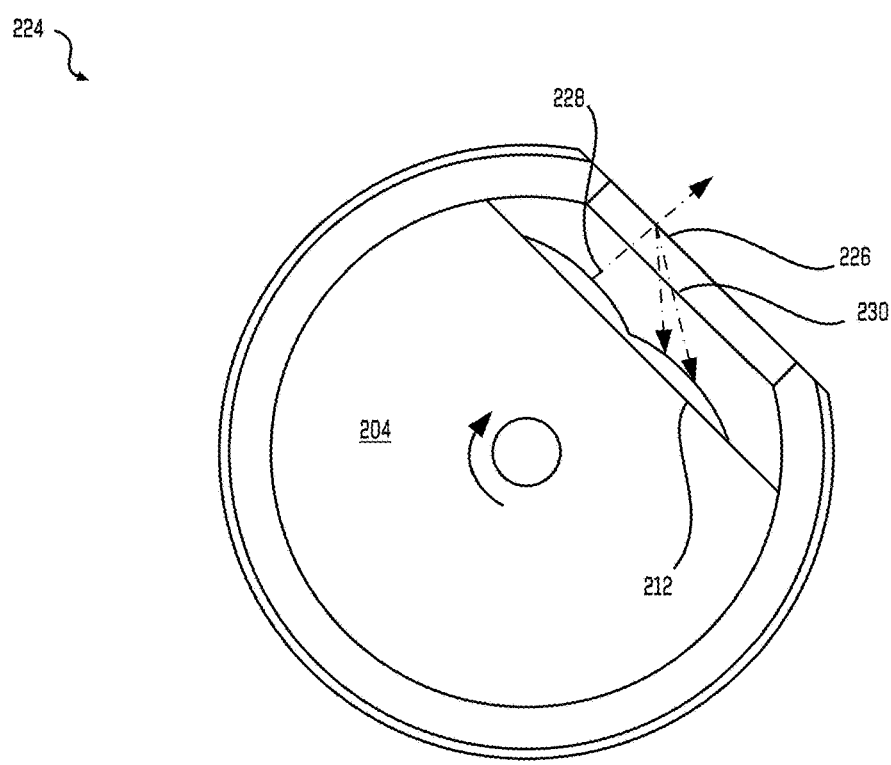
FIG. 2C is a simplified cross-sectional view of a LIDAR sensor assembly with a flat cover, in accordance with some examples of the present disclosure.
Figure 2D:
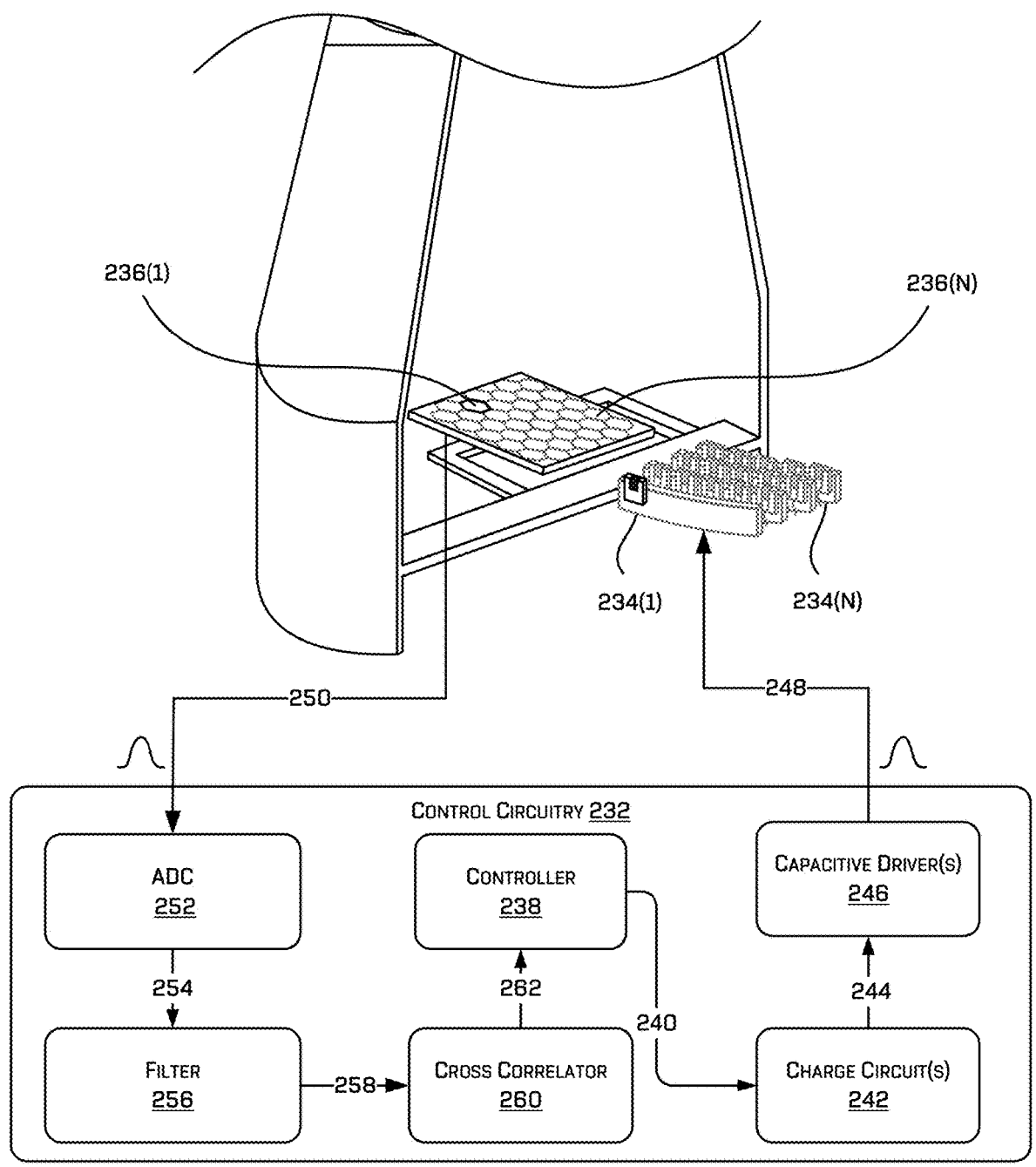
FIG. 2D is a partial cutaway view showing the internal components of the example LIDAR sensor assembly of FIG. 2A, in accordance with some examples of the present disclosure.

An example of a LIDAR sensor assembly suitable for use with the systems and methods disclosed herein is shown in FIGS. 2A-2C. The LIDAR sensor assembly 200 shown is a rotating sensor; however, as mentioned above, the LIDAR sensor assembly 200 could also be a fixed sensor, a solid-state sensor, or other type of LIDAR sensor. FIG. 2A is a perspective view of the example LIDAR sensor assembly 200 showing the outer housing 202. FIG. 2B is a simplified cross-sectional view of the example LIDAR sensor assembly 200, taken along line BB of FIG. 2A. FIG. 2C is a simplified cross-sectional view of an example LIDAR sensor assembly with a flat over, rather than a ring lens. FIG. 2D is a simplified cutaway view of the example LIDAR sensor assembly 200 including some of the internal components of the LIDAR sensor assembly 200.

FIG. 2A is a perspective view of the example LIDAR sensor assembly 200, showing an outer housing 202 to cover and protect a rotatable assembly 204. The outer housing 202 includes an opaque cap 206, main body 208, and a substantially transparent ring lens 210 interposed between the cap 206 and the main body 208. The cap 206 is disposed at, and covers, a spine 216 and a first end (the top) of the rotatable assembly 204 of the LIDAR sensor assembly 200. The ring lens 210 encircles the portion of the rotatable assembly 204 through which light enters and exits the lens assembly 212. Thus, the ring lens 210 facilitates the passage of light to and from the LIDAR sensor assembly 200 as the rotatable assembly 204 rotates within the outer housing 202. The ring lens 210 may be optically transparent or may focus and/or steer light.

The outer housing 202 encloses the rotatable assembly 204 and is coupled to the stationary portion 214 of the LIDAR sensor assembly 200. The cap 206 and the main body 208 are contoured to generally conform to an outer geometry of the rotatable assembly 204 around a majority of its circumference, before curving at an edge closest to the spine 216 to mate with lateral edges of the spine 216. Contoured trim pieces 218 may be included to fill a gap between the ring lens 210 and the spine 216 and to match the contours of the cap 206 and the main body 208. The contoured trim pieces 218 may be opaque or transparent.

One or more O-rings (not shown) may be provided at the interfaces between the cap 206 and the ring lens 210, and/or between the ring lens 210 and the main body 208, in order to prevent dirt and moisture from entering the outer housing 202. Gaskets and/or sealants may be provided between the outer housing 202 and the spine 216 in order to prevent dirt and moisture from entering the outer housing 202.

FIG. 2B is a simplified cross-sectional view of the example LIDAR sensor assembly 200, taken along line BB of FIG. 2A. For ease of illustration, a single light pulse 220, shown by the dot-dash line, is emitted from the rotatable assembly 204. In practice, however, the LIDAR sensor assembly may include multiple pulses of light, continuous light, or other firing schemes and may use multiple different laser light sources. In the example of FIG. 2B, at least a portion of the laser light is reflected by the ring lens 210. The cause of the reflection is somewhat immaterial, but may be caused by the interior surface of the ring lens 210 not being coated with an antireflective material, not being perfectly optically clear, being dirty, or simply because a high-power laser light is being used.

As shown, there may be multiple internal reflections 222 of the light pulse 220. At least some of the reflected light enters the lens assembly 212 and is received by a light sensor of the LIDAR sensor assembly 200. Upon receipt of the reflected light, the light sensor generates a signal indicating detection of the reflected light corresponding to reflection of the laser light from the ring lens 210. As mentioned above, however, unless the ring lens 210 is being used as a fixed surface to calibrate the LIDAR sensor assembly 200, this initial reflection is unwanted and can affect the accuracy of the LIDAR sensor assembly 200.

During operation, therefore, the LIDAR sensor assembly 200 receives multiple returns for every light emission (e.g., one or more reflections from the ring lens 210 as well as primary reflections from surface(s) in the field of view of the LIDAR sensor assembly 200). During distance measurements, however, the reflections from the ring lens 210 are extraneous noise that can degrade the accuracy of the LIDAR sensor assembly. Thus, the return signals corresponding to reflections from the ring lens 210 can be isolated and filtered out, thereby eliminating noise from the return signal and further improving accuracy of the LIDAR sensor assembly 200.

FIG. 2C is a simplified cross-sectional view of another example LIDAR sensor assembly 224 with a flat cover 226. As with the ring lens 210, the cover 226 may be optically transparent or may bend or focus the light in some way. For ease of illustration, a single light pulse 228, shown by the dot-dash line, is emitted from the rotatable assembly 204. In practice, however, the LIDAR sensor assembly may include multiple pulses of light, continuous light, or other firing schemes and may use multiple different laser light sources. In the example of FIG. 2C, at least a portion of the laser light is reflected by the flat cover 226. As before, the cause of the reflection is somewhat immaterial.

As shown, there may be multiple internal reflections 230 of the light pulse 228. At least some of the reflected light enters the lens assembly 212 and is received by a light sensor of the LIDAR sensor assembly 200. As before, upon receipt of the reflected light, the light sensor generates a signal indicating detection of the reflected light corresponding to reflection of the laser light from the flat cover 226. As mentioned above, however, unless the flat cover 226 is being used as a fixed surface to calibrate the LIDAR sensor assembly 200, this initial reflection is unwanted and can affect the accuracy of the LIDAR sensor assembly 200.

FIG. 2D is a partial cutaway view of an example system including the LIDAR sensor assembly 200 and control circuitry 232 to perform the aforementioned signal processing. The LIDAR sensor assembly 200 can comprise multiple laser light source(s) 234(1)-234(N) (collectively referred to as "laser light sources 234") and one or more light sensor(s) 236(1)-236(N) (collectively referred to as "light sensors 236"), where N is any integer greater than or equal to 1. The LIDAR sensor assembly 200 also includes control circuitry 232 configured to control the emission of light by the laser light sources 234 and to receive and analyze signals from the light sensors 236, among other things.

In some examples, the LIDAR sensor assembly 200 may include a plurality of channels by which a laser light source 234 may emit light along a precise direction so that the reflected light strikes a light sensor 236 that corresponds specifically to the laser light source 234. For example, laser light source 234(1) and light sensor 236(1) may correspond specifically to a first channel, whereas laser light source 234(N) and light sensor 236(N) may correspond specifically to an N-th channel. The optical system of the LIDAR sensor assembly 200 is designed so that beams from laser light sources 234 at different physical positions within the LIDAR sensor assembly 200 are directed outwardly at different angles in azimuth and elevation.

The control circuitry 232 includes a controller 238 that implements control and analysis logic. The controller 238 may be implemented in part by an FPGA (field-programmable gate array), a microprocessor, a DSP (digital signal processor), or a combination of one or more of these and other control and processing elements, and may have associated memory for storing associated programs and data.

The controller 238 implements control and analysis logic for each of the multiple channels. To initiate a single distance measurement using a single channel, for example, the controller 238 generates a first signal 240. The first signal 240 is received by a charge circuit 242, which determines an appropriate charge duration (e.g., based on desired intensity, pulse width, etc.) and provides a second signal 244 to charge a capacitive driver 246 for the specified charge duration. The capacitive driver 246 comprises a bank of one or more capacitors to drive the laser light sources 234. The duration of charge determines the intensity of the light emitted by the laser light sources 234.

After charging for the specified duration, the controller 238 causes the capacitive driver 246 to output an emitter drive signal 248 to the respective laser light source 234. The emitter drive signal 248 causes the respective laser light source 234 (e.g., laser light source 234(1) in this example) to emit constant laser light, for example, or one or more laser light pulses along an outward path toward the surface to which the distance is being measured. The burst is reflected by the surface in the scene back to the light sensor 236 of the corresponding channel (e.g., light sensor 236(1)).

Upon receipt of the reflected light, the light sensor 236(1) outputs a return signal 250 to an analog to digital converter (ADC) 252. The ADC 252 digitizes the analog return signal 250 into a plurality of discrete, digital samples with an assigned value (e.g., a voltage). Thus, the ADC 252 output is a plurality of samples that form a digital representation of the return signal 250, which can then be analyzed for local minima and maxima, as discussed below.

The return signal 250 is generally of the same shape as the emitter drive signal 248, although it may differ to some extent as a result of noise, interference, cross-talk between different emitter/sensor pairs, interfering signals from other LIDAR devices, pulse stretching, and so forth. To this end, as mentioned above, in some examples, control circuitry 232 can also include a filter 256 to smooth the return signal 250. The filter 256 can comprise, for example, a low-pass filter, a matched filter, a Weiner filter, a correlation, etc. Thus, the filter 256 outputs a smoothed, digitized signal 258, from which any false minima from multiple reflections, noise, or interference, for example, have been removed.

The return signal 250 will also be delayed with respect to the emitter drive signal 248 by an amount of time corresponding to the round-trip propagation time of the emitted laser light (i.e., the time of flight of the emitted light). To this end, the smoothed, digitized signal 258 is provided to a cross-correlator 260, which correlates the smoothed, digitized signal 258 with the corresponding emitter drive signal 248. Indeed, depending on the logic used in the cross-correlator 260, the comparison of the emitter drive signal 248 to the return signal 250 may sufficiently smooth the return signal 250 that the filter 256 is not needed. In other words, if, in the correlating the emitter drive signal 248 to the return signal 250, the cross-correlator 260 averages similar points along these curves, for example, this can serve to smooth the return signal 250. It should be noted that some, or all, of these functions 252, 256, 260 could be performed by the controller 238 with these functions 252, 256, 260 built-in.

Regardless, after correlation, the cross-correlator 260 outputs a time of flight signal 262, or data from which the time of flight can be calculated by the controller 238. The time of flight signal 262 indicates the amount of time, phase shift, or other data relating the emission of the laser light by the laser light source 234 and the detection of the reflection of the return of the laser light at the light sensor 236. Once a return signal is correlated or matched with the emitter drive signal 248, the controller 238 can then use data (e.g., actual timing events, phase shifts, etc.) from the time of flight signal 262 in combination with the known speed of light to calculate the distance to the surface. In practice the calculation may take into account a total roundtrip distance of the light path from the laser light source 234 to the light sensor 236 (i.e., including the distances between the laser light sources 234 and light sensors 236 and their respective lenses, etc.), any delays caused by electric components in the LIDAR sensor assembly 200, etc. The foregoing example is just one of many techniques that may be used to recover the time of flight of the emitted laser light.

Figure 3:
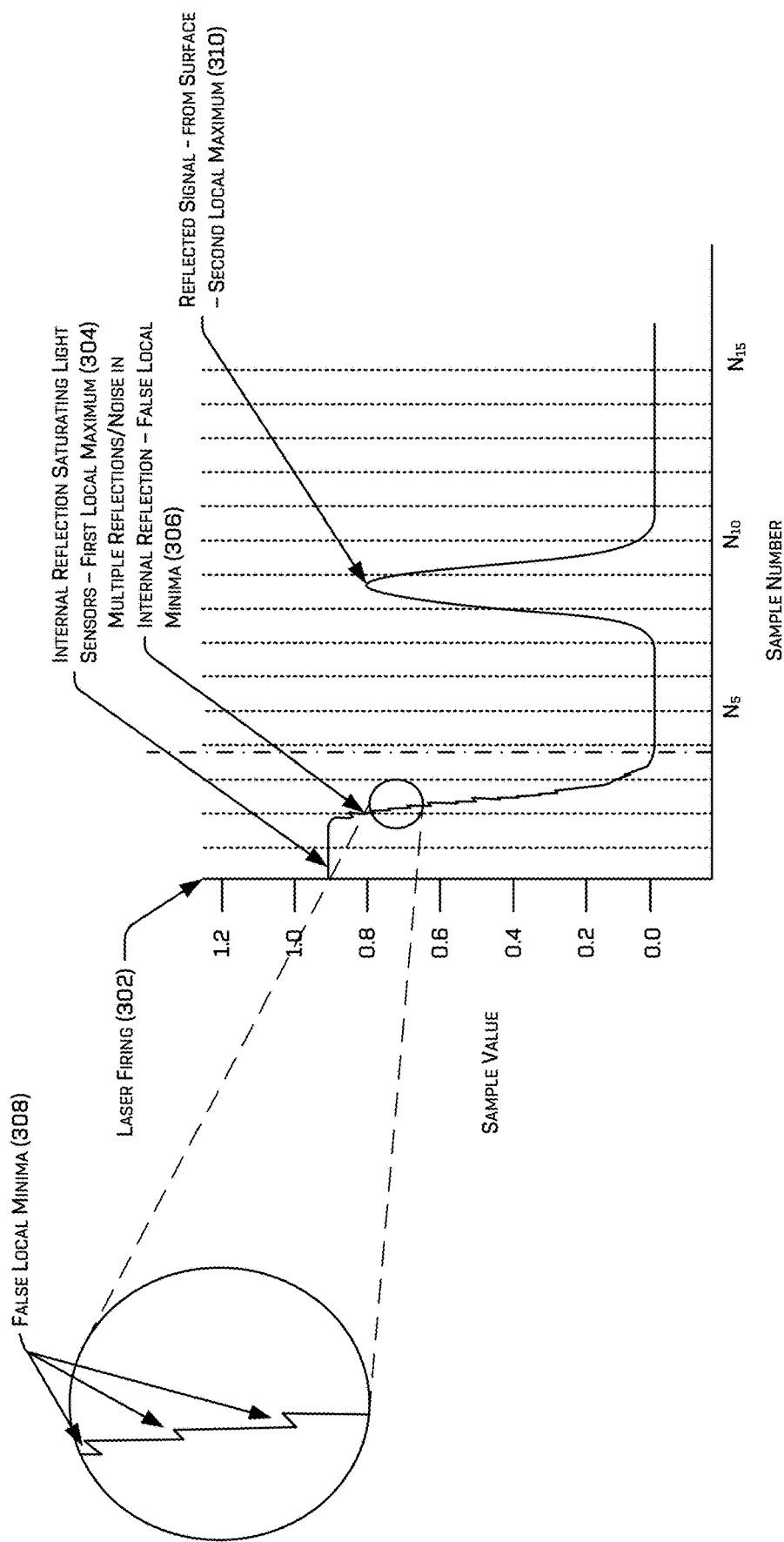
FIG. 3 is a graph including examples of a plurality of samples with multiple internal, or "false," reflections prior to processing, in accordance with some examples of the present disclosure.

FIG. 3 is a graphical depiction of an example of the internal reflections that can be caused by the optical component(s) 108 (e.g., a transparent cover 226, ring lens 210, other lenses, optics, mirrors, noise, interference, and other sources). In this example, the signal has not been passed through a low-pass filter, resulting in some additional irregularities in the return sample values. As mentioned above, this can cause unwanted local minima that can potentially result in inaccurate distance measurements.

As mentioned above in FIGS. 2A-2C, the laser light is emitted and then the signal is received at the light sensors 236 and converted into some suitable sample rate. Due to the high propagation speed of light, the samples would generally be taken on the order of single, or even fractions, of nanoseconds. As discussed above, reflection from a surface 300 meters away from the LIDAR sensor assembly 200, for example, would represent a total travel time (out and back) of the laser light of approximately 2 µs (2000 ns).

Of course, the optical component 108 is significantly closer to the laser light sources 234 and light sensors 236, for example; and thus, can generate one or more almost instantaneous reflections. As mentioned above, the optical component 108 can also create multiple reflections as the laser light from one or more laser light sources 234 reflects off of the optical component 108 at disparate angles, each of which return to the light sensor 236 at fractionally different times.

In addition, there may be noise or interference (electronic or environmental), for example, that contributes additional peaks in the sample values.

As shown in expanded detail view on the left hand side of FIG. 3, the laser light (shown firing at time=0 (302)) can be reflected off of one or more internal components of the LIDAR sensor assembly 200, which can create one or more local minima and maxima in the initial portion of the samples associated with internal reflections. In this example, the initial reflection off of the ring lens is represented by a first local maximum 304. In this case, the first local maximum 304 is so strong that the light sensor 236 initially saturates, resulting in a flat portion on the graph. The samples then begin to decline, but include multiple false local maxima 306 associated with multiple reflections, noise, interference, etc. In some cases, these may be reflections off the ring lens 210, for example, that reflected at a different angle, for example, which resulted in a slightly different travel time back to the light sensor 236.

As shown in detail in FIG. 3, regardless of the cause, the false local maxima 306 necessarily create false local minima 308. In FIG. 3, only three false local minima 308 are shown, but additional false minima 308 can be seen in the expanded detail view to the left of FIG. 3. These false local minima 308 can result in inaccurate distance measurements. If the method 500 (discussed below) identifies one of the false local minima 308 as the first local minimum ($N_{MIN}$), for example, then one of the false local maxima 306 caused by the noise/additional reflections/etc. may be identified as the second local maximum ($N_{MAX}$). This means that the false local maximum 306 caused by the noise/additional reflections is wrongly assumed to be the primary maximum 310 caused by the reflected light from the surface to which the distance is being measured. Of course, this results in a distance to the surface that is significantly shorter than the actual distance to the surface.

In this example, if one assumes a 10-ns sample rate and picks the false local maximum 306 caused by the noise/additional reflection that occurs at approximately 20 ns (there are many to choose from), then the distance would be calculated to be approximately 5.99 m. The primary reflection, on the other hand, indicated by the primary local maximum 310 occurs at approximately 87 ns, yielding a distance of approximately 26.08 m:

$$D_{Noise} = \frac{(2.0 \times 10^{-8} \text{ s} \times 299,792,458 \text{ m/s})}{2} \approx 5.99 \text{ m}$$

$$D_{Object} = \frac{(8.7 \times 10^{-8} \text{ s} \times 299,792,458 \text{ m/s})}{2} \approx 26.08 \text{ m}$$

In most instances, a 20-meter error would not be very useful. For vehicle navigation, for example, this could result in a collision or off-road excursion, among other things. In addition, this reading is simply erroneous. In other words, this reading represents picking a somewhat random value caused by extraneous reflections/interference/noise/etc. received at the light sensors 236. It would be useful, therefore, to smooth these false local maxima 306 and minima 308 associated with the initial internal (false) reflections into a smooth signal that can then be discarded, as discussed above.

Figure 4:
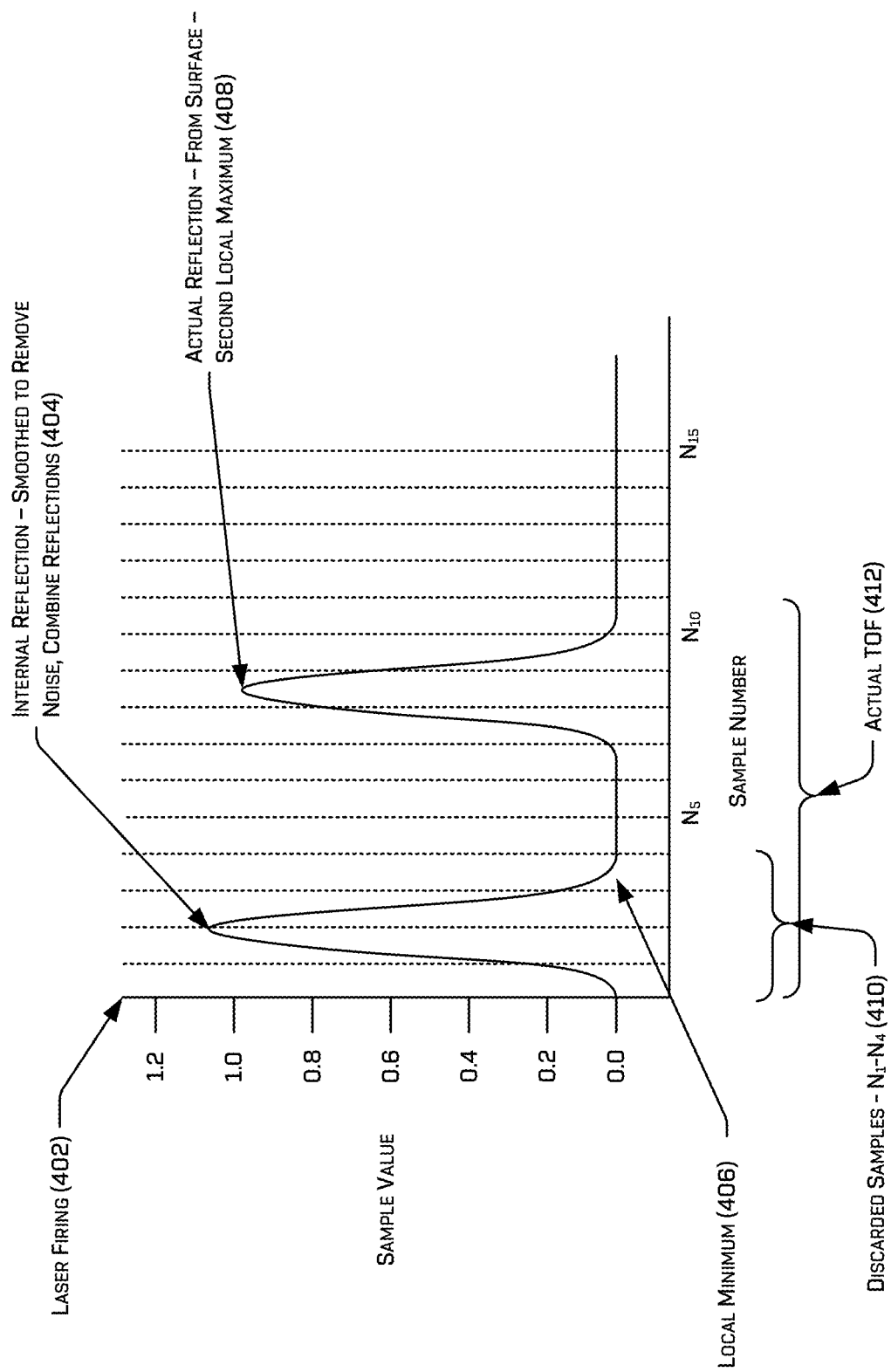
FIG. 4 is a graph including examples of a plurality of samples including a single internal reflection and a single surface reflection post-processing, in accordance with some examples of the present disclosure.

To this end, as shown in FIG. 4, the samples can first be smoothed by an appropriate electronic component, such as a low-pass filter. In this example, after the laser firing 402, the return signal still results in multiple maxima 404, 408, but the multiple, jagged false local maxima 306 and minima 308 seen in FIG. 3 have been smoothed into a single first local maximum 404. This enables the first local minimum 406 to be easily identified. Such a minimum 406 may be identified as the first sample to have a value equal to or greater than the previous sample. Subsequently, the second local maximum 408 can be identified to enable the actual location of the surface to be accurately calculated.

Thus, the initial samples 410 can be discarded, or disregarded, when calculating the distance to the surface. In this examples, the samples ($N_1$-$N_4$) from the laser firing 402 to the local minimum 406 are shown as discarded. One of skill in the art will recognize, however, that the samples from the laser firing 402 to the first local maximum 404 would also enable the method 500 to successfully find the second local maximum 408. Indeed, these samples need not be discarded at all, but this may reduce processing and/or memory overhead, for example, simply by reducing the amount of retained data.

As mentioned above, the actual TOF 412 to the surface is measured from the time of the laser firing 402 to the second local maximum 408 (i.e., not from the first local minimum 406 to the second local maximum 408). Again, assuming a 10-ns sample rate, in this case the distance to the surface is:

$$D_{Object} = \frac{(8.4 \times 10^{-8} \text{ s} \times 299,792,458 \text{ m/s})}{2} \approx 25.18 \text{ m}$$

Thus, the problem of false positives—discussed above with respect to FIG. 3—is mitigated.

Example LIDAR Sensor Assembly Signal Processing

Figure 5A:
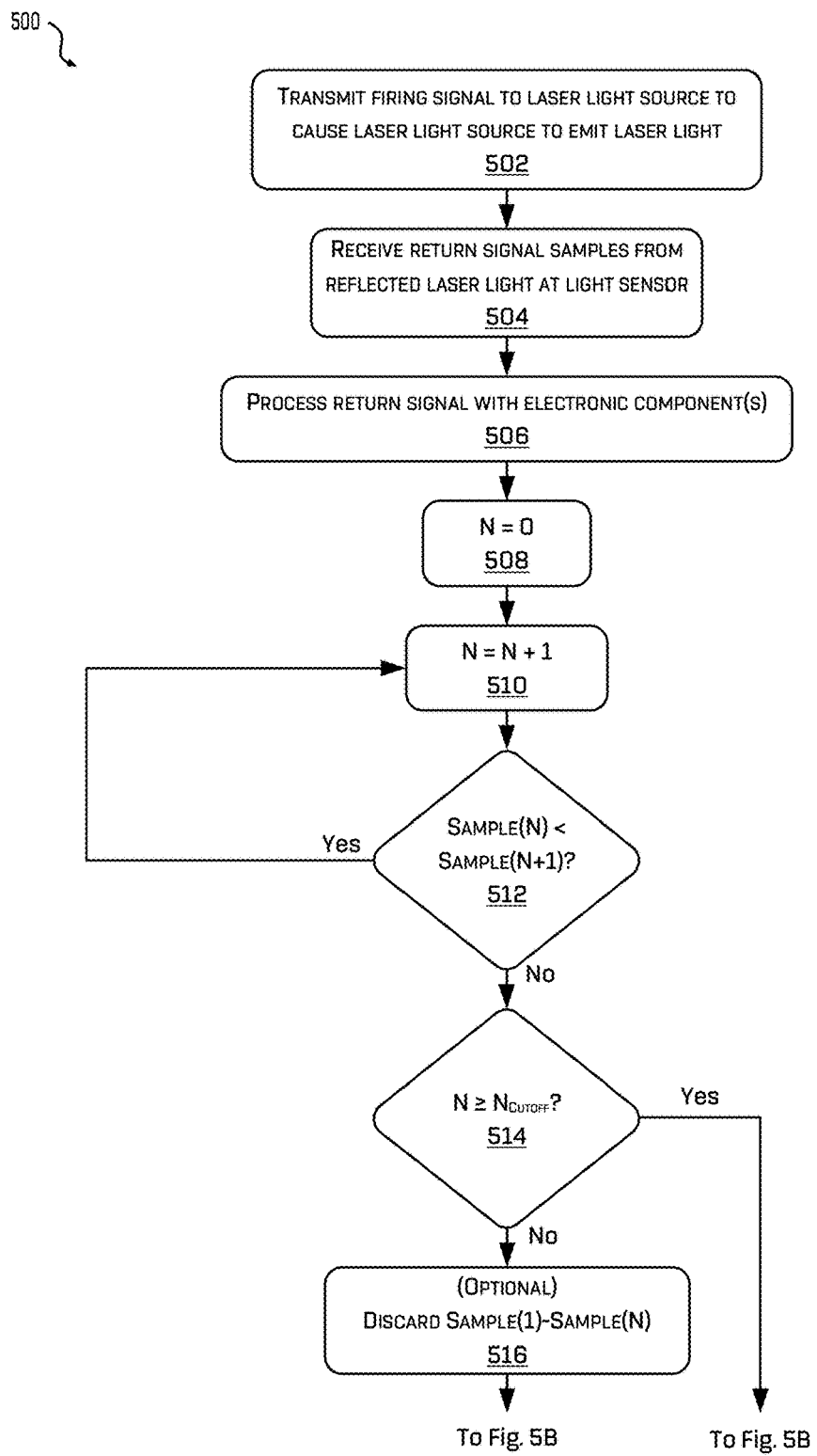
FIGS. 5A and 5B are flowcharts illustrating an example method of measuring a distance to a surface with a LIDAR sensor assembly, in accordance with some examples of the present disclosure.
Figure 5B:
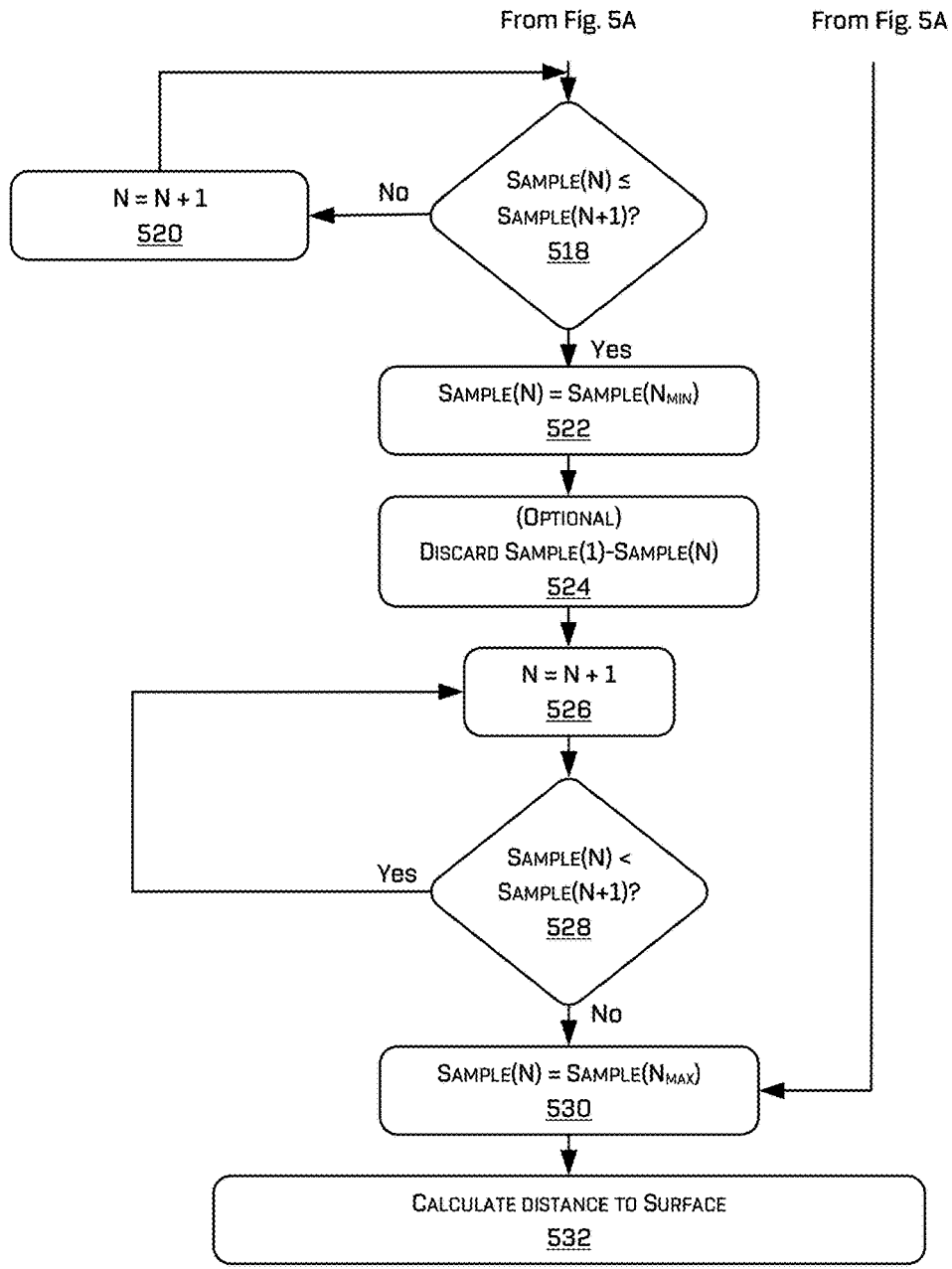

As shown in FIGS. 5A and 5B, examples of the present disclosure can comprise a method 500 for processing signals received from a LIDAR sensor assembly (e.g., LIDAR sensor assembly 100, 200) to improve accuracy, while maintaining or decreasing the minimum effective range of the LIDAR sensor assembly (e.g., shortening how close to the sensor a surface can accurately be detected). In some examples, as discussed above, the LIDAR sensor assembly can include a controller, a low-pass filter, a correlator, or other electronic components, to smooth signals from the LIDAR sensor assembly, discard false positives, and calculate accurate TOFs (and thus, distances).

At 502, the controller can transmit a firing signal (e.g. a reference signal) to cause the laser light source of the LIDAR sensor assembly to emit laser light (e.g., one or more pulses, a constant beam, etc.), or Tx signal. In some examples, the controller can send the firing signal directly to the laser light source. In other examples, the controller can send the firing signal to a driver, or other electronic device (e.g., the charge circuit, discussed above), and the electronic device can cause the laser light source to emit the Tx signal.

Regardless of how/where the firing signal is transmitted, at 504, the controller can receive a number (N) of samples, or Rx signals, from the receiver, or light sensors, and the ADC of the LIDAR sensor assembly. The controller may receive samples at a predetermined sample interval (e.g., every 0.1, 1, 10, or 100 ns) for a predetermined sample period (e.g., 2, 3, or 5 ms). In some examples, the sample period may be based on the effective range of the LIDAR sensor assembly. A sensor with a 300-meter range, for example, may have a sample period of approximately 3 µs (i.e., light takes just over 1 µs to travel 300 meters×2 (to return)+some buffer).

At 506, the method 500 can pass the N samples through one or more electronic components (e.g., a filter, a correlator, etc.). As discussed above, when comparing FIG. 3 to FIG. 4, a low-pass filter, for example, can smooth the samples and/or remove any local minima and maxima that may be caused by, for example, multiple internal reflected signals from the optical component, interference, noise, or other anomalies.

In some examples, the false local minima can be caused by the internal reflections from one or more surfaces proximate to the mounting location of the LIDAR sensor assembly. If the LIDAR sensor assembly is mounted on a vehicle, for example, the laser light can be reflected off of the hood, glass, and other surfaces of the vehicle and can result in multiple reflected signals. Thus, any temporary dips and spikes in the samples can be smoothed, which will generally result in two distinct maxima—a internal reflection off the ring lens or other "false" surfaces—which actually appears as the first maxima in time—and a primary reflection from the surface to which the distance is being measured—which actually appears as the second maxima in time.

At 508, a counter, N, can be set to zero. The counter can enable the method 500 to iterate through all of the samples. Thus, at 510, the counter can be incremented by one, to N=1 in this case, to start the analysis with the first sample Sample (1). In some examples, the sample number may be incremented, for example, by 10-20 samples before proceeding. In such examples, the number of samples initially discarded may be based on, for example, physical limitations of the system (e.g. a system may not have any expected returns associated with data less than 10 cm, 1 m, 5 m, etc.).

At 512, the method 500 can iteratively locate the first local maximum in the return signal. Thus, each sample, Sample (N), can be compared to the next sample, Sample (N+1), in the return signal to determine if the next sample is greater or less than the current sample. In the first iteration, therefore, Sample (1) can be compared to Sample (2).

If Sample (N) is less than Sample (N+1), then the maximum has not yet been identified. In this case, at 510, the counter can again be incremented by one, in this case to N=2, and the method 500 continues iteratively until the maximum is found.

If, on the other hand, Sample (N) is not less than Sample (N+1), then Sample (N) is the first local maximum (i.e., the top of the curve has been located). In this case, at 514, in some examples, the method 500 can next determine if the maximum that has been located is associated with internal reflections or the primary reflection. In other words, if conditions are such that no measurable internal reflections are present, then the method 500 can determine that the maximum found is associated with the primary reflection. This may be because the optical component has just been replaced or cleaned, has been treated with an anti-reflective coating, the incident angle of the laser light on the optical component is favorable, etc. Indeed, this can also enable the method 500 to be used on LIDAR sensor systems with no optical components, LIDAR sensor systems on which the optical component has been removed for service, etc.

Regardless, at 514, the method 500 can determine if the sample number, N, associated with the maximum is above or below a threshold number of samples, $N_{CUTOFF}$, after which the maximum cannot be caused by internal reflections. Thus, based purely on distance, if the path from the optical component is 10 cm away from the laser light sources and light sensors, for example, then any samples after approximately 0.1 ns can be discarded. In some examples, it may be desirable to add some additional buffer to account for any saturation of the light sensors at high power levels, as discussed above with reference to FIG. 3. At a 0.05 ns sample rate, for example, discarding the first 40 samples only reduces the range of the LIDAR sensor assembly to:

$$D_{Surface} = \frac{(2 \times 10^{-9} \text{ s} \times 299,792,458 \text{ m/s})}{2} \approx .299 \text{ m}$$

or approximately one foot. This is likely a perfectly acceptable minimum range for most applications. Of course, this value can also be varied according to the power level of the light sources—i.e., greater power levels may cause the light sensors to saturate over longer periods of time.

If the sample number, N, is above the threshold number of samples, $N_{CUTOFF}$, then, at 530, Sample (N) can be set to Sample ($N_{MAX}$), or the sample associated with the maximum caused by the primary reflection. In other words, because the maximum occurred after any internal reflections could have occurred, the maximum is associated with the primary reflection and can be used to calculate the time of flight of the laser light. In at least other examples, such a system may incorporate all samples in evaluating a distance to a surface (e.g., by peak detection, cross-correlation, edge detection, etc.). At 532, the time of flight can then be used to accurately calculate the distance to the surface.

If the sample number, N, is below the sample number of the cutoff, $N_{CUTOFF}$, then, the maximum is associated with internal reflections. In this case, as mentioned above, in some examples, Sample (1)-Sample (N), can be discarded. This may be useful in some circumstance, but is completely optional.

As shown in FIG. 5B, regardless of whether the samples are discarded or not, the method can continue by finding the next local minimum. To this end, at 518, the method can determine if the current sample, Sample (N), is less than or equal to the next sample, Sample (N+1). If not, then Sample (N) is not a minimum, and at 520, N can again be incremented by one to iteratively continue to locate the minimum.

If, on the other hand, Sample(N) is the minimum (Sample (N)<Sample (N+1)), then the minimum has been found (e.g., local minimum 406 in FIG. 4). In this case, then at 522, Sample(N) can be set to Sample($N_{MIN}$), or the sample associated with the first local minimum. In some examples, as 524, the method 500 can discard the samples up to Sample ($N_{MIN}$), though this is again optional.

At 526, having located the first local minimum, the method 500 can optionally iterate N by one to determine the location of the second maximum—the maximum associated with the primary reflections. To this end, at 528, the method 500 can iteratively locate the second local maximum in the return signal. Thus, each sample, Sample (N), can be compared to the next sample, Sample (N+1), in the return signal to determine if the next sample is greater or less than the current sample. If Sample (N) is less than Sample (N+1), then the maximum has not yet been identified. In this case, at 526, the counter can again be incremented by one, and the method 500 continues iteratively until the maximum is found.

If, on the other hand, Sample (N) is not less than Sample (N+1), then Sample (N) is associated with a maximum (i.e., the top of the curve has been located). In this case, at 530, N can be set to $N_{MAX}$, or the sample associated with local maximum caused by the primary reflection. Using this information (e.g., the time associated with Sample ($N_{MAX}$), at 532, the method 500 can determine the distance to the surface. Such a calculation may be performed, for example, by directly determining a time associated with the second local maxima, performing a cross-correlation, performing some other convolution, etc.

In some examples, the local maxima may not occur exactly at the time one sample is taken, resulting in two samples with equal values at the local maximum. This may be simply because the actual local maximum does not occur precisely at the time the sample is recorded. This may also be because the LIDAR sensor assembly is using the laser light source at a high power setting and the receiver (light sensors) of the LIDAR sensor assembly has become saturated over some period of time, creating a "flat spot" in the return signal. In these cases, the time can be averaged over two or more samples that include a value at the local maximum. Additionally, or alternatively, other techniques may be used for estimating a peak during saturation, such as taught in U.S. patent application Ser. No. 15/925,772 entitled "Detecting a Laser Pulse Edge for Real Time Detection", which is incorporated by reference.

In some examples, the method 500 can then calculate the distance to the surface by multiplying the time at the second local maximum by the speed of light and dividing by two (i.e., the time for the laser light to travel out and back):

$$D_{Object} = \frac{(T_{N_{MAX}} \times c)}{2}$$

Where $D_{surface}$ is the distance to the target surface, $T_{N_{MAX}}$ is the time associated with the second local maximum, and c is the speed of light. So, for example, if the second local maximum occurs at the sample associated with 2000 ns, then the distance to the surface is approximately:

$$D_{Surface} = \frac{(2 \times 10^{-6} \text{ s} \times 299,792,458 \text{ m/s})}{2} \approx 300 \text{ m}$$

Of course, the accuracy of this calculation can vary according to the accuracy of the LIDAR sensor assembly and associated electronics, environmental conditions, and the application. For applications in which autonomous, or semi-autonomous, robots are working in a well-defined area (e.g., a warehouse or baggage handling facility), the calculation can be almost binary—e.g., there is an object within a predetermined distance or there is not. For applications in which fully autonomous vehicles are operating at relatively high speeds amongst pedestrians, cyclist, and other vehicles, on the other hand, sensors and calculations can be appropriately accurate (e.g., within centimeters).

The method 500 is illustrated as a collection of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. In addition, while the method 500 discussed above uses an iterative comparison of values to determine minima and maxima, a person of skill in the art will recognize that other methods could be used (e.g., windowed averages, running averages, etc.). As a non-limiting example, a window of five (5) samples may be averaged together, as opposed to comparing individual samples directly, as depicted in FIG. 5A-5B.

Example System of LIDAR Sensor Assemblies Coupled to Vehicle

Examples of the present disclosure can be useful in many different applications. The LIDAR sensor assemblies 100, 200 and methods 500 could be used for navigational purposes (e.g., passenger vehicles, boats, aircraft, etc.) and ranging (e.g., rifle optics, golf rangefinders, etc.), among other things. Indeed, while discussed as a LIDAR based system, the LIDAR sensor assemblies 100, 200 and methods 500 disclosed herein could be used for other, similar sensors that rely on reflected waves for distance, and other, measurements (e.g., RADAR, ultrasound, infrared, etc.).

Figure 6:
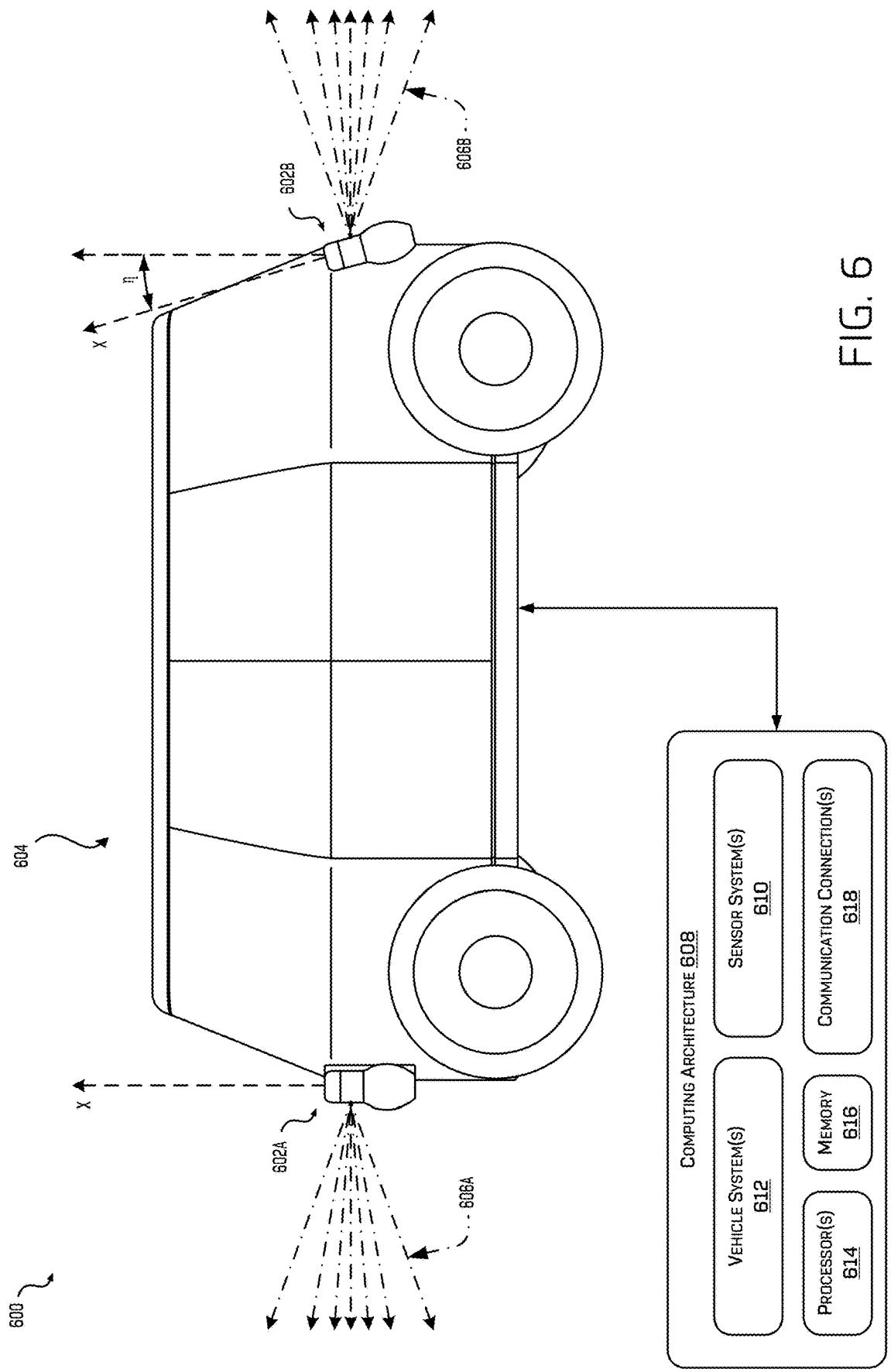
FIG. 6 is a side view of an example vehicle showing example mounting orientations for LIDAR sensor assemblies, in accordance with some examples of the present disclosure.

One application to which the LIDAR sensor assemblies 100, 200 and methods 500 discussed herein are well suited is in the navigation and collision avoidance systems of a vehicle. To this end, FIG. 6 is a side view of an example system 600 including a multiple LIDAR sensor assemblies 602A, 602B (referred to collectively as "LIDAR sensor assemblies 602") mounted to a vehicle 604 at different orientations. Specifically, the system 600 includes a first LIDAR sensor assembly 602A mounted at a front corner of the vehicle 604. The first LIDAR sensor assembly 602A is mounted such that an axis of rotation X of the first LIDAR sensor assembly 602A is oriented substantially vertically (i.e., normal to the horizon). The first LIDAR sensor assembly 602A is configured such that a pattern of emitted light 606A is spanning the horizon, with some portions of the emissions being angled above the horizon and some portions of the emissions that are below the horizon. In some examples, the pattern of emitted light may be concentrated around the horizon with less emitted light at angles further from the horizon; however, other scan patterns are also contemplated having light emitted at other angles relative to the horizon.

The second LIDAR sensor assembly 602B is mounted such that an axis of rotation X of the first LIDAR sensor assembly 602A is offset by angle relative to vertical (i.e., is tilted at an oblique angle from normal to the horizon). Nevertheless, the second LIDAR sensor assembly 602B is configured such that a pattern of emitted light 606B is substantially the same as that of the first LIDAR sensor assembly 602A. This may be achieved, for example, by angling one or more mirrors or lenses in the LIDAR sensor assembly; however, as above, other scan patterns are also contemplated having light emitted at other angles relative to the horizon.

In some examples, different LIDAR sensor assemblies of the vehicle 604 may have different scan patterns. For instance, some LIDAR sensor assemblies (e.g., corner mounted LIDAR sensor assemblies) may have scan patterns centered around the horizon, while one or more other LIDAR sensor assemblies (e.g., nose or tail mounted LIDAR sensor assemblies) may have scan patterns oriented below the horizon (e.g., to detect objects closer to a front or rear of the vehicle). These and other variations of mounting configurations are contemplated for LIDAR sensor assemblies according to this disclosure.

FIG. 6 also illustrates an example computing architecture 608 of the vehicle 604. The computing architecture 608 includes one or more sensor systems 610 (e.g., LIDAR sensor assembly 200). The sensor system(s) 610 include the LIDAR sensor assemblies 602 and may include one or more other sensor systems such as, for example, one or more cameras, radar sensors, microphones, navigation sensors (e.g., GPS, compass, etc.), motion sensors (e.g., inertial measurement units (IMUs), odometers, etc.), and/or environmental sensors (e.g., temperature sensors, pressure sensors, humidity sensors, etc.). The sensor system(s) 610 provide input directly to one or more vehicle systems 612. In some examples, the vehicle system(s) 612 may include a vehicle control system to control steering, propulsion, braking, safety systems, and/or communication systems of the vehicle 604. Additionally, in some examples, such as when the vehicle 604 is an autonomous vehicle, the vehicle systems may also include a localizer system to estimate a change in position of the vehicle 604 over time, a perception system to perform object detection and/or classification, and/or a planner system to determine routes and/or trajectories to use to control the vehicle. Additional details of localizer systems, perception systems, and planner systems that are usable can be found in U.S. patent application Ser. No. 15/281,416, filed Sep. 30, 2016, entitled "Estimating Friction Based on Image Data," which is incorporated herein by reference.

The computing architecture 608, which can be the same as, or different than, the control circuitry 232, also includes one or more processors 614 and memory 616 communicatively coupled with the one or more processors 614. The processor(s) 614 may be any suitable processor capable of executing instructions to implement the vehicle system(s) 612. The processor(s) 614 may comprise, for example, one or more central processing units (CPUs), graphics processing units (GPUs), or any other device or portion of a device that processes electronic data from registers and/or memory to transform that electronic data into other electronic data that may be stored in registers and/or memory.

Memory 616 is an example of non-transitory computer-readable media. Memory 616 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information.

The computing architecture 608 also includes one or more communication connections 618 that enable communication by the vehicle 604 with one or more other local or remote computing devices. The communications connection(s) 618 include physical and/or logical interfaces for connecting the computing architecture 608 to another computing device or a network. The communications connection(s) 618 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A. A LIDAR sensor assembly comprising a laser light source to emit laser light, a light sensor configured to produce a light signal in response to sensing reflected light corresponding to one or more reflections of the laser light from a plurality of surfaces, an optical component through which light from the laser light source is emitted and through which reflected light is received at the light sensor; and a controller communicatively coupled to the laser light source and the light sensor, the controller being operative to transmit a firing signal to the laser light source to cause the laser light source to emit laser light at a first time, receive an output signal from the light sensor indicating detection of reflected light from the plurality of surfaces, provide, based at least in part on the output signal, a plurality of samples, process the plurality of samples with an electronic component configured to filter the plurality of samples, determine a first sample associated with a local maximum in the plurality of samples, determine a second sample associated with a local minimum in the plurality of samples, discard a first set of samples of the plurality of samples, the first set of samples comprising samples provided between the firing of the laser light source and the second sample, and calculate a distance from the LIDAR sensor assembly to a target surface of the plurality of surfaces based on a second set of samples, the second set of samples comprising the second sample and samples provided after the second sample.

B. The LIDAR sensor assembly of paragraph A, wherein determining a value of the second sample associated with the local minimum comprises determining the second sample in the second set is less than, or equal to, a value of a third sample in the second set, wherein the third sample is provided after the second sample.

C. The LIDAR sensor assembly of paragraph A or B, wherein calculating the distance from the LIDAR sensor assembly to a target surface based on the second set of samples comprises determining a third sample associated with a local maximum in the second set of samples.

D. The LIDAR sensor assembly of paragraph A, B, or C, wherein calculating the distance comprises one or more of performing an edge detection, performing a peak detection, or performing a cross-correlation.

E. The LIDAR sensor assembly of paragraph A, B, C, or D, wherein calculating a distance from the LIDAR sensor assembly to the target surface comprises determining a second time associated with the local maximum in the second set, the local maximum associated with a reflection off of the target surface, and calculating a time of flight to the target surface based at least in part on the first time and the second time.

F. The LIDAR sensor assembly of paragraph A, B, C, D, or E, wherein the optical component comprises a lens or a transparent cover.

G. The LIDAR sensor assembly of paragraph A, B, C, D, E, or F, wherein the electronic component comprises a low-pass filter.

H. A method to determine a distance to a surface, the method comprising transmitting a firing signal to a laser light source to cause the laser light source of a LIDAR sensor assembly to emit laser light at a first time, receiving an output signal from a light sensor of the LIDAR sensor assembly indicating detection of reflected light from a plurality of surfaces, determining, based at least in part on the output signal, a plurality of samples, processing the plurality of samples with an electronic component configured to filter the plurality of samples, determining a first sample associated with a local maximum in the plurality of samples, determining whether the first sample is within a threshold number of samples, and determining a second sample associated with a local minimum in the plurality of samples, discarding a first set of samples of the plurality of samples, the first set of samples comprising samples provided between the firing of the laser light and the second sample, and calculating a distance from the LIDAR sensor assembly to a target surface of the plurality of surfaces based on a second set of samples, the second set of samples comprising samples provided after the second sample.

I. The method of paragraph H, wherein calculating the distance from the LIDAR sensor assembly to a target surface is based at least in part on a cross-correlation between a reference signal and the output signal.

J. The method of paragraph H or I, wherein the threshold number of samples is determined based at least in part on a distance between the laser light source and an optical component of the LIDAR sensor assembly.

K. The method of paragraph H, I, or J, wherein the LIDAR sensor assembly is mounted on a vehicle, and wherein the threshold number of samples is determined based at least in part on a distance between the laser light source and a surface of the vehicle.

L. The method of paragraph H, I, J, or K, further comprising processing the plurality of samples with an electronic component configured to filter the plurality of samples and produce an output, the output of the electronic component comprising a filtered signal.

M. The method of paragraph H, I, J, K, or L, wherein the electronic component comprises a cross-correlator, a peak detector, or an edge detector.

N. The method of paragraph H, I, J, K, L, or M, wherein the first sample is within the threshold number of samples, and wherein the local maximum is associated with an internal reflection off of an optical component of the LIDAR sensor assembly.

O. A system comprising a vehicle. And a LIDAR sensor assembly mounted to the vehicle, the LIDAR sensor assembly including a laser light source to emit light at a first time, and a light sensor configured to produce a light signal in response to sensing reflected light corresponding to a reflection of the light off of an internal surface and an external surface, and control circuitry communicatively coupled to the laser light source and the light sensor, the control circuitry being operative to receive an output signal from the light sensor of the LIDAR sensor assembly, the output signal indicating detection of the reflected light off the internal surface and the external surface, determine a plurality of samples associated with the output signal, determine a second time associated with a local minimum in the plurality of samples, the local minimum associated with an internal reflection from the internal surface, determine, based at least in part on the second time, a subset of the plurality of samples; and calculate a time of flight to the external surface based at least in part on the subset of the plurality of samples.

P. The system of paragraph O, wherein the control circuitry is further operative to filter the plurality of samples with an electronic component, wherein calculating the time of flight comprises one or more of performing a peak detection, performing an edge detection, or performing a cross-correlation.

Q. The system of paragraph O or P, wherein the electronic component comprises a low-pass filter.

R. The system of paragraph O, P, or Q, wherein the internal surface comprises a lens in the LIDAR sensor assembly, and wherein the internal reflection is at least partially associated with reflected light from the lens.

S. The system of paragraph O, P, Q, or R, wherein the internal surface comprises a transparent cover in the LIDAR sensor assembly, and wherein the internal reflection is at least partially associated with reflected light from the transparent cover.

T. The system of paragraph O, P, Q, R, or S, wherein the internal surface comprises a surface of the vehicle, and wherein the internal reflection is at least partially associated with reflected light from the surface of the vehicle.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a light sensor; and
control circuitry communicatively coupled to the light sensor, the control circuitry being configured to perform operations comprising:
receiving sensor data from the light sensor, the sensor data comprising a plurality of samples;
determining whether a sample of the plurality of samples is associated with a surface external to the system (an external surface) based at least in part on at least one of:
whether the sample was received within a threshold quantity of samples; or
whether the sample was received within a threshold time; and
determining a distance to the external surface based on the determining whether the sample is associated with the external surface.

2. The system of claim 1, wherein determining whether the sample is associated with the external surface is further based at least in part on (i) the sample being a local maximum of the plurality of samples and (ii) at least one of the sample being received within the threshold quantity of samples or the sample being received within the threshold time.

3. The system of claim 1, the operations further comprising determining that the sample is associated with a surface of the system (an internal surface); and
determining to disregard the sample based at least in part on the sample being associated with the internal surface.

4. The system of claim 1, the operations further comprising filtering the sample using a low-pass filter.

5. The system of claim 1, wherein:
the sample is a first sample, and
the operations further comprise:
determining to use a second sample of the plurality of samples to calculate the distance to the external surface based at least in part on:
the second sample being associated with a local maximum; and
at least one of whether the second sample was received after receipt of the threshold quantity of samples or whether the second sample was received after the threshold time.

6. The system of claim 1, wherein:
the sample is a first sample of a plurality of samples; and
the operations further comprise:
determining that a second sample of the plurality of samples represents a local minimum in the plurality of samples, the second sample received after the first sample;
determining to disregard the first sample and samples received prior to the first sample to calculate the distance to the external surface; and
calculating the distance to the external surface based on the second sample and on samples received after the second sample.

7. The system of claim 1, further comprising a light source to emit light, wherein the light sensor is configured to produce a signal in response to sensing reflected light.

8. A method comprising:
receiving sensor data from a light sensor associated with a sensor system, the sensor data comprising a plurality of samples;
determining whether a sample of the plurality of samples is associated with a surface external to the sensor system (an external surface) based at least in part on at least one of:
whether the sample was received within a threshold quantity of samples; or
whether the sample was received within a threshold time; and
determining a distance to the external surface based on the determining whether the sample is associated with the external surface.

9. The method of claim 8, wherein the determination of whether the sample is associated with the external surface is further based in part on (i) the sample being a local maximum and (ii) at least one of the sample being received within the threshold quantity of samples or the sample being received within the threshold time.

10. The method of claim 8 further comprising,
determining that the sample is associated with a surface of the sensor system (an internal surface); and determining to disregard the sample based at least in part on the sample being associated with the internal surface.

11. The method of claim 8 further comprising, comprising filtering the sample using a low-pass filter.

12. The method of claim 8, wherein:
the sample is a first sample of the plurality of samples; and
the method further comprises:
determining to use a second sample of the plurality of samples to calculate the distance to the external surface based at least in part on:
the second sample being associated with a local maximum; and
at least one of whether the second sample was received after receipt of the threshold quantity of samples or whether the second sample was received after the threshold time.

13. The method of claim 8, wherein:
the sample is a first sample of a plurality of samples; and
the method further comprises:
determining that a second sample of the plurality of samples represents a local minimum in the plurality of samples, the second sample received after the first sample;
determining to disregard the first sample and samples received prior to the first sample to calculate the distance to the external surface; and
calculating the distance to the external surface based on the second sample and on samples received after the second sample.

14. The method of claim 13, wherein;
the method further comprises determining a third sample of the plurality of samples is associated with a local maximum, the third sample included in the samples received after the second sample, wherein calculating the distance to the external surface is based a time associated with the third sample.

15. One or more non-transitory computer-readable media storing instructions that, when executed, cause one or more processors to perform operations comprising:
receiving sensor data from a light sensor associated with a sensor system, the sensor data comprising a plurality of samples;
determining whether a sample of the plurality of samples is associated with a surface external to the sensor system (an external surface) based at least in part on at least one of:
whether the sample was received within a threshold quantity of samples; or
whether the sample was received within a threshold time; and
determining a distance to the external surface based on the determining whether the sample is associated with the external surface.

16. The one or more non-transitory computer-readable media of claim 15, wherein the determination of whether the sample is associated with the external surface is further based in part on (i) the sample being a local maximum and (ii) at least one of the sample being received within the threshold quantity of samples or the sample being received within a threshold time.

17. The one or more non-transitory computer-readable media of claim 15, the operations further comprising:
determining that the sample is associated with a surface of the sensor system (an internal surface); and
determining to disregard the sample based at least in part on the sample being associated with the internal surface.

18. The one or more non-transitory computer-readable media of claim 15, the operations further comprising filtering the sample using a low-pass filter.

19. The one or more non-transitory computer-readable media of claim 15, wherein:
the sample is a first sample of a plurality of samples, and
the operations further comprise:
determine to use a second sample of the plurality of samples to calculate the distance to the external surface based at least in part on:
the second sample being associated with a local maximum; and
at least one of whether the second sample was received after receipt of the threshold quantity of samples or whether the second sample was received after the threshold time.

20. The one or more non-transitory computer-readable media of claim 15, wherein:
the sample is a first sample of a plurality of samples; and
the operations further comprise:
determining that a second sample of the plurality of samples represents a local minimum in the plurality of samples, the second sample received after the first sample;
determining to disregard the first sample and samples received prior to the first sample to calculate the distance to the external surface; and
calculating the distance to the external surface based on the second sample and on samples received after the second sample.

* * * * *